(12) United States Patent
Corey et al.

(10) Patent No.: US 7,509,723 B2
(45) Date of Patent: Mar. 31, 2009

(54) METHOD OF REMOVING A CENTER MEMBER FROM A DISC PACK COUPLING

(75) Inventors: Dennis J. Corey, Youngsville, PA (US); Daniel Briggs, Warren, PA (US)

(73) Assignee: Rexnord Industries, LLC, Milwaukee, WI (US)

( * ) Notice: Subject to any disclaimer, the term of this patent is extended or adjusted under 35 U.S.C. 154(b) by 270 days.

(21) Appl. No.: 11/409,866

(22) Filed: Apr. 24, 2006

(65) Prior Publication Data
US 2006/0252555 A1    Nov. 9, 2006

Related U.S. Application Data

(60) Provisional application No. 60/675,909, filed on Apr. 28, 2005.

(51) Int. Cl.
*B23P 11/00* (2006.01)
(52) U.S. Cl. .............. 29/426.1; 29/426.5; 29/426.6; 29/525.01; 29/525.11; 464/99
(58) Field of Classification Search ............. 29/402.03, 29/426.1, 426.5, 426.6, 525.11; 464/99
See application file for complete search history.

(56) References Cited

U.S. PATENT DOCUMENTS

| | | | |
|---|---|---|---|
| 3,500,660 A | 3/1970 | Anderson | |
| 3,654,775 A | 4/1972 | Williams | |
| 4,796,742 A | 1/1989 | Etchell | |
| 5,221,232 A | 6/1993 | Nameny | |
| 5,888,140 A | 3/1999 | Klingler et al. | |
| 5,944,611 A * | 8/1999 | McCullough | 464/69 |
| 6,312,339 B1 | 11/2001 | Beyert | |
| 2001/0049307 A1* | 12/2001 | Scheithauer et al. | 464/99 |

FOREIGN PATENT DOCUMENTS

| | | |
|---|---|---|
| CA | 2 415 006 A1 | 6/2004 |
| DE | 85 25 842 U1 | 10/1985 |
| DE | 86 09 743 U1 | 7/1986 |
| DE | 93 05 154 U1 | 6/1993 |
| GB | 546 351 A | 7/1942 |
| GB | 704 041 A | 2/1954 |

OTHER PUBLICATIONS

Tschan Installation and Operation Manual, Torsionally Rigid Coupling, Feb. 2004.
Rex Couplings, Thomas Axial Slide Disc Coupling, 2004.
Rex Couplings, Thomas Flexible Disc Couplings, 2003.
International Search Report dated Aug. 1, 2006.

* cited by examiner

*Primary Examiner*—Jermie E Cozart
(74) *Attorney, Agent, or Firm*—Quarles & Brady LLP

(57) ABSTRACT

A disc pack coupling for transmitting torque between two shafts approximately aligned on a shaft axis includes a first hub assembly, a second hub assembly, and a center member extending between the first and second hub assemblies. Each hub assembly includes an axially compressible disc pack interposed between a hub and an end adapter. The center member has opposing ends, and is axially split into at least two pieces. A flange extending radially from each of the center member ends includes a assembly/disassembly hole formed between two of the at least two pieces.

3 Claims, 3 Drawing Sheets

METHOD OF REMOVING A CENTER MEMBER FROM A DISC PACK COUPLING

CROSS REFERENCES TO RELATED APPLICATIONS

The application claims the priority benefit of U.S. Provisional Patent Application No. 60/675,909 filed on Apr. 28, 2005.

STATEMENT REGARDING FEDERALLY SPONSORED RESEARCH

Not Applicable.

BACKGROUND OF THE INVENTION

This invention relates to shaft couplings, and more particularly, to disc pack couplings for transmitting torque between two shafts approximately aligned on a shaft axis.

Flexible disc pack couplings, such as Thomas Flexible Disc Couplings sold by Rexnord Industries, Inc., Milwaukee, Wis., are known in the art for transmitting torque between adjacent generally axially aligned first and second shafts. These couplings include a disc pack interposed between a pair of hubs or formed part of hub assemblies. The disc pack is typically formed from a plurality of stacked coaxial discs.

Close coupled disc pack couplings are especially suitable for use for close coupled gear and grid couplings, and where overall shaft to shaft spacing is minimal. In close coupled disc pack couplings, hub assemblies including a disc pack are fixed to each shaft. The hub assemblies are joined by a center member that transmits torque between the hub assemblies.

The minimal space between the hub assemblies requires an axially split center member joining the hubs in order to remove the center member and gain access to the disc packs for replacement without completely removing the hub assembly from the shaft or even completely removing the piece of equipment from which one of the shaft extends. The disc packs axially urge the hub assemblies into axial engagement with the center member. In order to remove the split center member, the disc packs must be compressed axially to disengage the hub assemblies from the center member which complicates removal of the center member. Moreover, the minimal spacing between the shafts joined by the close coupled disc pack coupling further increases the difficulty of fitting tools or clamps between the hub assemblies to compress the disc packs and remove and/or insert the center member. Therefore, a need exists for a close coupled disc pack coupling and method of use in which the disc packs can be easily compressed to remove the center member.

SUMMARY OF THE INVENTION

The present invention provides a disc pack coupling for transmitting torque between two shafts approximately aligned on a shaft axis. The coupling includes a first hub assembly, a second hub assembly, and a center member extending between the first and second hub assemblies. The first hub assembly includes an axially compressible first disc pack interposed between a first hub and a first end adapter. The second hub assembly includes an axially compressible second disc pack interposed between a second hub and a second end adapter and at least two threaded assembly/disassembly holes. The center member has opposing ends, and is axially split into at least two pieces. A flange extending radially from each of the center member ends includes a assembly/disassembly hole formed between two of the at least two pieces.

A general objective of the present invention is to provide a close coupled disc pack coupling and method of use in which the disc packs can be easily compressed to remove the center member. The objective is accomplished by providing assembly/disassembly holes through the center member and in the end adapters for receiving screws and/or rigid objects that can compress the disc packs.

Another objective of the present invention is to radially retain the center member. This objective is accomplished by providing an end adapter having an axially extending flange pilot that engages the center member to radially retain the center member.

The foregoing and other objects and advantages of the invention will appear from the following description. In the description, reference is made to the accompanying drawings which form a part hereof, and in which there is shown by way of illustration a preferred embodiment of the invention.

Figure 1:
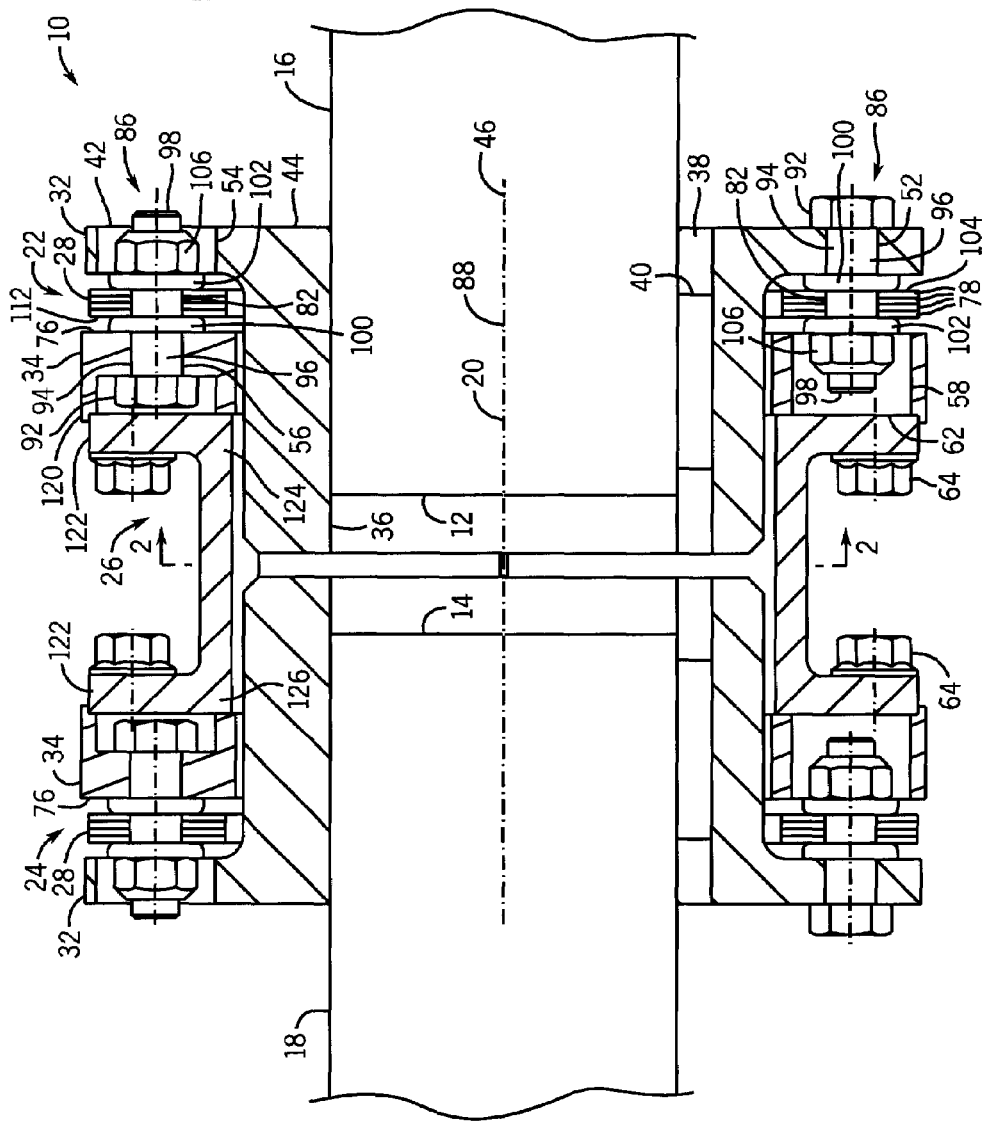
FIG. 1 is a sectional view of a coupling incorporating the present invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

Figure 2:
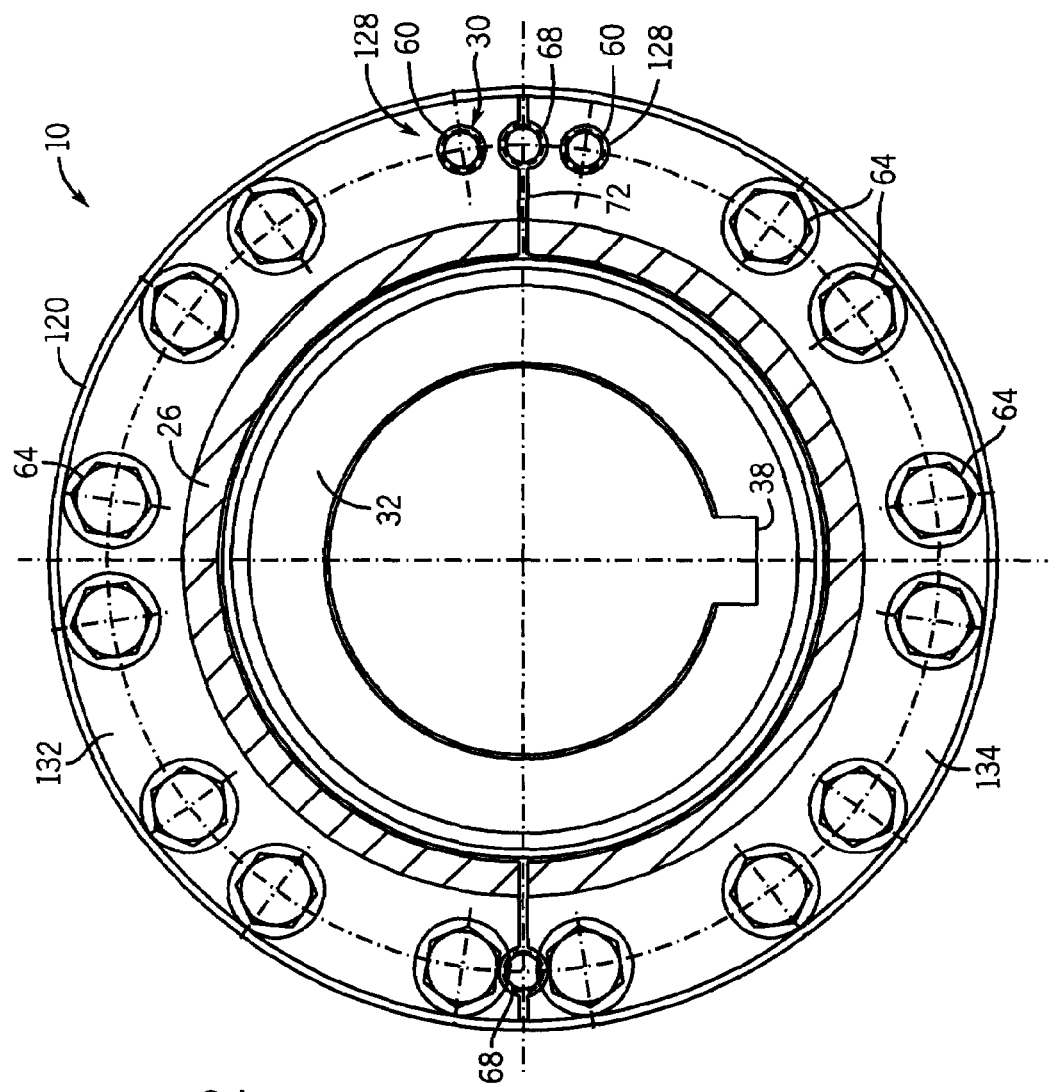
FIG. 2 is a sectional view along line 2-2 of FIG. 1.

As shown in FIGS. 1 and 2, a close coupled disc pack coupling 10 incorporating the present invention couples minimally spaced shaft ends 12, 14 for transmitting torque between two shafts 16, 18 approximately aligned on a shaft axis 20. The coupling 10 includes a hub assembly 22, 24 fixed to each shaft end 12, 14. The hub assemblies 22, 24 are joined by an axially split center member 26 that transmits torque between the hub assemblies 22, 24 and is radially retained by the hub assemblies 22, 24 to prevent inadvertent radial ejection of the center member 26. Advantageously, the split center member 26 includes assembly/disassembly holes 30 that simplify disassembly and removal of the split center member 26, as described below, as well as assembly and insertion of the split center member 26.

Each hub assembly 22, 24 is fixed to one of the shaft ends 12, 14, and transmits torque from the respective shaft 16, 18 to the center member 26. The hub assemblies 22, 24 are substantially identical having a disc pack 28 interposed between a hub 32 and an end adapter 34. Accordingly, the hub 32, end adapter 34, and disc pack 28 of one hub assembly 22 will be described relative to one shaft 16 with the understanding, that the hub 32, end adapter 34, and disc pack 28 of the other hub assembly 24 is substantially the same relative to the other shaft 18.

The hub 32 includes a cylindrical body 36 having a radially extending flange 42 formed at one end 44, and is rotatable about a hub axis 46. The body 36 of the hub 32 is rotatably fixed to the shaft end 12 of the shaft 16 substantially coaxially with the shaft 16 using methods known in the art, such as welding, mechanical fasteners, keys, threads, and the like, for transmitting torque between the hub assembly 22 and shaft 16. In the embodiment disclosed herein, a keyway 38 formed in the hub body 36 receives a key 40 fixed to the shaft for rotatably fixing the hub 32 relative to the shaft 16, Preferably, the hub 32 is formed from machined metal castings, such as steel.

A plurality of circumferentially spaced axially extending hub holes 52, 54 are formed through the flange 42 parallel to the hub axis 46. A first set of the hub holes 52 has a first diameter, and a second set of the hub holes 54 has a second diameter that is larger than the first diameter. Preferably, the first set of the hub holes 52 circumferentially alternate with the second set of hub holes 54, such that each hub hole 52 of the first set of hub holes 52 is between hub holes 54 of the second set of hub holes 54.

The end adapter 34 is an annular ring substantially coaxial with the hub axis 46 and encircles the shaft 16. A plurality of circumferentially spaced axially extending end adapter holes 56, 58 are formed through the end adapter 34 parallel to the hub axis 46. A first set of the end adapter holes 56 has a first diameter, and a second set of the end adapter holes 58 has a second diameter that is larger than the first diameter. Preferably, the first set of the end adapter holes 56 circumferentially alternate with the second set of end adapter holes 58, such that each end adapter hole 56 of the first set of end adapter holes 56 is between end adapter holes 58 of the second set of end holes 58. Each hub hole 52 of the first set of hub holes 52 in the hub 32 is aligned with one end adapter hole 58 of the second set of end adapter holes 58 in the end adapter 34, such that the aligned hub and end adapter holes 52, 54, 56, 58 in the hub and end adapter 32, 34 have different diameters to form a pair of aligned hub and end adapter holes 52, 58 or 54, 56.

A plurality of circumferentially spaced axially extending, inwardly opening, end adapter threaded assembly holes 60 are formed in an inwardly facing face 62 of the end adapter 34 for receiving center joint screws 64, or bolts, to fix the center member 26 relative to the end adapter 34. A pair of inwardly opening threaded assembly/disassembly holes 68 formed in the inwardly facing face 62 of end adapter 34 are formed 180° apart and across a split line 72 formed through the center member 26. The assembly/disassembly holes 68 receive screws 74 for removing the center member 26, as described below.

The disc pack 28 is interposed between the hub 32 and an outwardly facing face 76 of the end adapter 34, and is preferably formed from the plurality of coaxial discs 78. Most preferably, the disc pack 28 includes eight to twelve discs 78 stamped from a sheet of stainless or carbon steel. However, any number of discs 78 formed from any suitable material, such as metal, an elastomeric material, and the like, can be used without departing from the scope of the invention. A plurality of circumferentially spaced disc pack holes 82 are formed through the disc pack 28, and extend substantially parallel to a disc axis 88 substantially coaxial with the hub axes 46. Each disc pack hole 82 is aligned with a pair of the aligned hub and end adapter holes 52, 58 or 54, 56 for receiving a bolt 86 therethrough to fix the disc pack to either the hub 32 end adapter 34.

The disc pack 28 is fixed to the hub and end adapter 32, 34 using the bolts 86 extending through the aligned holes 52, 82, 58 or 54, 82, 56 formed through the hub and end adapters 32, 34 and disc pack 28. Each bolt 86 includes a bolt head 92 formed at a proximal end 94 of a threaded bolt body 96. Preferably, the bolts 86 are alternately inserted from opposite sides of the disc pack 28 through the aligned holes 52, 82, 58 or 54, 82, 56.

The disc pack 28 is fixed to the hub 32 by inserting a distal end 98 of the bolt body 96 into the one of the holes 52 of the first set of holes 52 formed through the flange 42 of the hub 32, and through a washer 100 aligned with the one of the holes 52. The bolt 86 is further inserted in a direction of bolt insertion and received in one of the holes 82 of the disc pack 28 from an axially outwardly facing face 104 of the disc pack 28 which faces the hub flange 42, through a washer 102 aligned with the one of the holes 82 of the disc pack 28, and into one of the holes 58 of the second set of holes 58 formed through the end adapter 34. A nut 106 threadably engaging the bolt body 96 is received in the one of the holes 58 of the second set of holes 58 formed through the end adapter 34, and is tightened against the washer 102 to fix the disc pack 28 to the hub 32.

The disc pack 28 is fixed to the end adapter 34 by inserting the distal end 98 of the bolt body 96 of another bolt 86 through one of the holes 56 of the first set of holes 56 formed through the end adapter 34, and through a washer 100 aligned with the one of the holes 56. In a direction of bolt insertion opposite to the direction of bolt insertion for the bolt 86 fixing the disc pack 28 to the hub 32, the bolt 86 is further inserted through one of the holes 82 of the disc pack 28 from an axially inwardly facing face 112 of the disc pack 28, through a washer 102 aligned with the one of the holes 82 of the disc pack 28, and into one of the holes 54 of the second set of holes 54 formed through the flange 42 of the hub 32. A nut 106 threadably engaging the bolt body 96 is received in the one of the holes 54 of the second set of holes 54 formed through the flange 42 of the hub 32, and is tightened against the washer 102 to fix the disc pack 28 to the end adapter 34. Although inserting bolts 86 through the aligned holes 52, 84, 58 in a first bolt direction to fix the hub 32 to the disc pack 28 and inserting bolts 86 through the aligned holes 55, 84, 56 in a second bolt direction opposite to the first bolt direction to fix the end adapter 34 to the disc pack 28 is described, the bolts 86 can all be inserted in the same direction without departing from the scope of the invention.

An axially extending circumferential flange pilot 120, or spigot, extending axially inwardly from each end adapter 34 extends over and engages the axially split center member 26 to prevent inadvertent radial ejection of the center member 26. Advantageously, the disc pack 28 in each hub assembly 22, 24 axially biases the end adapter 34 axially inwardly to maintain the axially extending circumferential flange pilot 120 in contact with the axially split center member 26.

The cylindrical axially split center member 26 is rigidly fixed to the end adapter 34 of each hub assembly 22, 24, and transmits torque between the hub assemblies 22, 24. A radially extending flange 122 at each end 124, 126 of the center member 26 includes axially extending center member assembly holes 128 aligned with the threaded assembly holes 60 formed in each adjacent end adapter 34. Centerjoint screws 64 extending through the axially extending center member assembly holes 128 threadably engage the threaded assembly holes 60 formed in the adjacent end adapter 34 to rigidly fix the center member 26 to the adjacent hub assemblies 22, 24.

The cylindrical center member 26 is split axially into two pieces 132, 134 to allow removal of the center member 26, and thus the disc packs 28 without disengaging the hub assemblies 22, 24 from the shaft ends 12, 14. A pair of the center member assembly/disassembly holes 30 formed through each radially extending flange 122 of the center member 26 across the axial split line 72 defined between the two pieces 132, 134 of the center member 26 are aligned with the assembly/disassembly holes 68 formed in the end adapters 34. Preferably, each assembly/disassembly hole 30 is bisected by the axial split line 72 and provides a key for locating where an axial saw cut is made to cut the center member 26 into the pieces 132, 134.

The center member assembly/disassembly holes 30 receives screws 74 threadably engaging the end adapter assembly/disassembly holes 68 to compress the disc packs 28 and urge the end adapters 32 out of engagement with the center member 26 to remove the center member pieces 132, 134 from between the end adapters 34. Although a center member 26 axially split into two pieces 132, 134 is shown, the center member 26 can be axially split into any number of pieces without departing from the scope of the invention.

Figure 3:
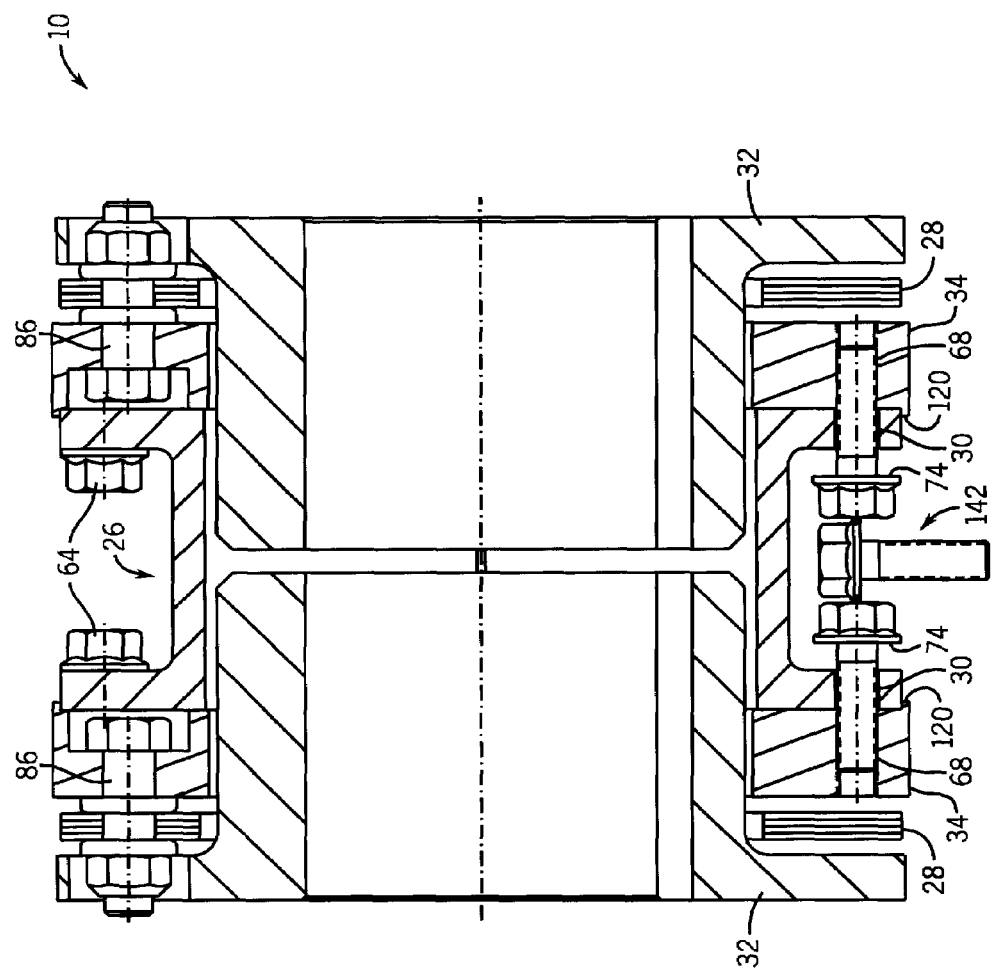
FIG. 3 is a sectional view of the coupling of FIG. 1 set up for removal of a center member piece.

In use, as shown in FIG. 3 with reference to FIGS. 1 and 2, the center member pieces 132, 134 are removed to gain access to bolts 86 extending through the disc packs 28 by first removing all of the center joint screws 64 extending through the assembly holes 128 formed through the center member flanges 122 and threadably engaging the assembly holes 60 formed in the end adapters 34. Once all of the center joint screws 64 are removed, a screw 74, such as one of the previously removed center joint screws 64, is inserted through each assembly/disassembly hole 30 formed through the center member flanges 122 and threadably engaged with the aligned threaded assembly/disassembly hole 68 formed in the adjacent end adapter 34, such that pairs of axially aligned screws 74 extend inwardly toward each other from the opposing hub assemblies 22, 24.

In order to compress the disc packs 28 and urge the end adapters 34 out of engagement with the center member 26 to remove the center member pieces 132, 134 from between the hub assemblies 22, 24, a rigid object 142, such as one of the loose center joint screws 64 previously removed from one of the hub assemblies 22, 24, is positioned between one of the pairs of the axially aligned screws 74. The rigid object 142 must have a width, such that the sum of the length of the aligned screws 74 and the rigid object 142 therebetween is greater than the distance between the hub assemblies 22, 24 in order to compress the disc packs 28, such that the end adapter axially extending flange pilot 120 of at least one end adapter 34 disengages from the at least one piece 132, 134 of the center member 26. The aligned screws 74 are then rotated to axial move the screws 74 inwardly against the rigid object 142.

Once both of the aligned screws 74 engage the rigid object 142, continued rotation of one of the aligned screws 74 urges the end adapters 34 outwardly against the disc packs 28 until at least one end adapter axially extending flange pilot 120 disengages from at least one of the center member pieces 132, 134. Once the center member piece 132, 134 is disengaged from the end adapter axially extending flange pilot 120, the center member piece 132, 134 either falls away from the coupling 10, or can be easily lifted away. Of course, the center member pieces 132, 134 can be inserted into the space between the hub assemblies 22, 24 by compressing the disc packs 28, as described above, to assemble the coupling 10 without departing from the scope of the invention.

Although a coupling 10 having threaded assembly/disassembly holes 68 formed in each end adapter 34 is disclosed for receiving screws 74 to compress the disc packs 28. The present invention can be practiced with one or more threaded assembly/disassembly holes formed in only one end adapter. In this embodiment, the rigid object can include a pin extending through the assembly/disassembly hole formed between the center member pieces. The pin engages the other end adapter to urge the other end adapter outwardly upon rotation of a screw threadably engaging the threaded assembly/disassembly hole formed in the one end adapter.

In another embodiment of the present invention, the end adapters do not include any threaded assembly/disassembly holes. In this embodiment, an expandable assembly, such as a pair of threaded rods, each rod having an end threadably received in a center nut, can be used to compress the disc packs. Each rod has a first end threadably engaging the center nut. An opposing end of each rod extends through one of the assembly/disassembly holes formed through the center member flanges and engages one of the end adapters. By preventing rotation of the rods, such as by extending non-circular opposing ends of the rods through non-circular assembly/disassembly holes, as the nut is turned, the rods move axially outwardly to compress the disc packs. Of course, non-threaded pilot holes can be formed in the end adapters to prevent the opposing rod ends from slipping off of the end adapters once the center element pieces are removed without departing from the scope of the invention. The pilot holes can be non-circular to prevent rotating of the rods.

While there has been shown and described what are at present considered the preferred embodiment of the invention, it will be obvious to those skilled in the art that various changes and modifications can be made therein without departing from the scope of the invention defined by the appended claims. Therefore, various alternatives and embodiments are contemplated as being within the scope of the following claims particularly pointing out and distinctly claiming the subject matter regarded as the invention. Moreover, although the present invention is especially suitable for use with close coupled disc pack coupling, the present invention can be used with disc pack couplings that are not close coupled without departing from the scope of the invention.

We claim:

1. A method of removing a center member piece from a disc pack coupling including a first hub assembly including an axially compressible first disc pack interposed between a first hub and a first end adapter, said first end adapter including a threaded hole, a second hub assembly including an axially compressible second disc pack interposed between a second hub and a second end adapter, and a center member having opposing ends and extending between said first and second end adapters, said center member being axially split into at least two pieces and including a center member flange extending radially from each of said opposing ends, each center member flange including a hole aligned with said threaded hole formed in said first end adapter, said method comprising:
   extending a first screw through one of said holes formed through one of said center member flanges;
   threadably engaging said first screw with said threaded hole formed in said first end adapter; and
   trapping a rigid object between said first screw and said second end adapter to axially compress said first and second disc packs and remove at least one of said center member pieces.

2. The method as in claim 1, in which said second end adapter includes a threaded hole opening toward and substantially aligned with said threaded hole formed in said first end adapter, and said method includes:
   extending a second screw through another of said holes formed through another of said center member flanges;
   threadably engaging said second screw through said threaded hole formed in said second end adapter, wherein said first screw and second screw are substantially axially aligned; and trapping said rigid object between said first screw and said second end adapter to axially compress said first and second disc packs and remove at least one of said center member pieces include trapping said rigid object between said first and second screws.

3. The method as in claim 1, in which at least one of said first and second end adapters includes an axially extending flange pilot extending axially over one of said center member flanges for radially retaining said center member, and said method includes axially compressing said first and second disc packs sufficiently to disengage said axially extending flange pilot from said one of said center member flanges.

* * * * *

UNITED STATES PATENT AND TRADEMARK OFFICE
CERTIFICATE OF CORRECTION

PATENT NO. : 7,509,723 B2  Page 1 of 1
APPLICATION NO. : 11/409866
DATED : March 31, 2009
INVENTOR(S) : Corey et al.

It is certified that error appears in the above-identified patent and that said Letters Patent is hereby corrected as shown below:

Column 5, lines 50 and 53 "flange pilot 120" should be changed to -- flange 120 --

Signed and Sealed this

Fourteenth Day of July, 2009

JOHN DOLL
*Acting Director of the United States Patent and Trademark Office*